United States Patent [19]

Napadow

[11] 4,223,599

[45] Sep. 23, 1980

[54] SPRAY BOOTH WITH ENERGY SAVING AND FIRE PROTECTION SYSTEMS

[75] Inventor: Stanley C. Napadow, Chicago, Ill.

[73] Assignee: Protectaire Systems Corp., Elgin, Ill.

[21] Appl. No.: 973,947

[22] Filed: Dec. 28, 1978

[51] Int. Cl.[2] .............................................. B01D 45/00

[52] U.S. Cl. ................................ 98/115 SB; 118/326; 118/DIG. 7

[58] Field of Search .................... 98/115 R, 115 SB, 1; 55/217, 212; 118/326, DIG. 7, 634; 169/48, 56, 65; 340/568, 686; 307/119, 141, 141.4; 251/305

[56] References Cited

U.S. PATENT DOCUMENTS

| | | | |
|---|---|---|---|
| 1,789,945 | 1/1931 | Ready | 118/326 X |
| 1,859,797 | 5/1932 | Ready | 118/326 X |
| 2,694,466 | 11/1954 | Bingman | 98/115 SB X |
| 3,010,451 | 11/1961 | Hodgins | 126/285 B |
| 3,388,746 | 6/1968 | Lihberg | 169/56 |
| 3,616,745 | 11/1971 | Russell, Sr. | 98/115 R |
| 3,773,028 | 11/1973 | Schreibeis | 126/285 B |
| 3,943,375 | 3/1976 | Williamson | 307/141 |
| 3,951,051 | 4/1976 | Dry | 126/285 B |

FOREIGN PATENT DOCUMENTS

| | | | |
|---|---|---|---|
| 662751 | 7/1938 | Fed. Rep. of Germany | 118/326 |

*Primary Examiner*—Ronald C. Capossela
*Assistant Examiner*—Harold Joyce
*Attorney, Agent, or Firm*—Fitch, Even, Tabin, Flannery & Welsh

[57] ABSTRACT

This invention teaches an improved exhaust system to be used with a paint spray booth and having a continuously operating power exhaust fan. The exhaust system has a damper that is opened when spraying actively is taking place in the spray booth and that is closed when there is no spraying actively taking place in the spray booth. A control switch is mounted in any of several locations to determine when the spray gun is in use or is not in use. Thus, the control switch is actuated when the spray gun is hung up . . . indicating a nonuse condition of the spray system; whereupon use of the spray gun lifts the gun from the hook to indicate spraying activity. A motor drives the damper to the opened position; and a spring biases the damper to the closed position. A timer is also used to delay the closing of the damper until between twenty and possibly two hundred seconds have lapsed after spraying activity has terminated. This purges the spray booth while yet allows for automatic damper control under normal spraying sequences of use and nonuse. A fire sensing switch is used to deenergize the damper motor to allow the damper to be closed in the event of a fire.

7 Claims, 3 Drawing Figures

SPRAY BOOTH WITH ENERGY SAVING AND FIRE PROTECTION SYSTEMS

BACKGROUND OF THE INVENTION

In commercial paint spray systems, it is typical to provide a spray booth and an exhaust system for withdrawing excess paint vapors from within the confines of the spray booth. The exhausted air and vapors are initially cleaned by any of several known cleaning means and is then dumped outside of the spray booth and typically ever to the atmosphere outside the building or enclosure housing the spray booth. A fan or blower is used to draw enclosure air through the confines of the spray booth and to force this air and the excess paint vapors through the cleaning means and up the exhaust duct to discharge. Known exhaust systems typically have a damper control for shutting off the exhaust duct responsive to a fire sensing means detecting a fire. It is important to close the damper control in the event of a fire, since the smoke otherwise rises through the open duct to feed the fire, and further the fire itself can rapidly spread through the duct system to the roof of the building.

The exhaust system need really be operated only when there is contaminating excess paint vapors actually in the confines of the spray both, and operation at other times can add needlessly to the operating costs of the exhaust system. This would by both from the standpoint of the electric power needed to operate the exhaust fan for exhausting the air and vapors through the system, and also from the standpoint of the wasted energy that is used to heat the enclosure air that is then just dumped to the atmosphere. Even with the exhaust system deenergized, the convective air flow up the open exhaust duct can allow the heated enclosure air to wastefully escape to atmosphere.

SUMMARY OF THE INVENTION

This invention provides an improved exhaust system to be used with a paint spray booth and which has a continuously operating power exhaust fan or blower, the exhaust system also having a damper that is opened when paint spraying actively is being conducted in the spray booth and that is closed when there is no paint spraying actively being conducted in the spray booth. Specifically, the system includes a control switch which can be mounted in any of several locations to determine when the spray gun is in use or is not in use. Thus activation of this control switch indicating spraying activity is taking place provides a circuit that energizes a motor which drives the damper to the opened position, while activation of this control switch indicating that there is no spraying activity taking place deenergizes the damper opening motor and allows a spring to shift the damper to the closed position. Preferably a timer is also used so that after spraying activity has terminated, a delay typically between twenty and possibly two hundred seconds will lapse before the damper will be closed. This thereby purges the confines of the spray booth while yet allows for automatic damper control under normal spraying sequences of use and nonuse. A fire sensing switch further is used in connection with the exhaust system which deenergizes the damper opening motor and thereby allows the damper to be closed in the event of a fire.

DETAILED DESCRIPTION OF THE INVENTION

Figure 1:
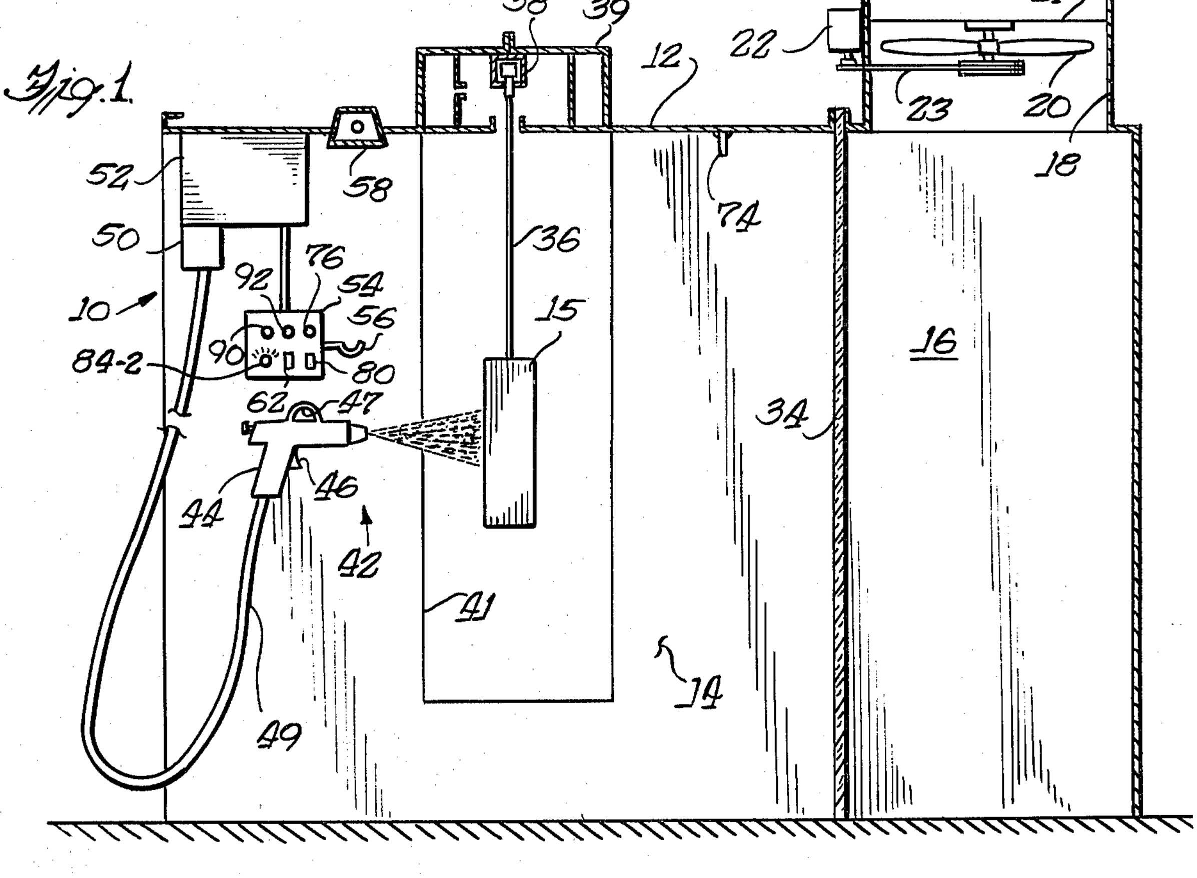
FIG. 1 is an elevational sectional view as seen generally from the side of the disclosed spraying system illustrating the spray booth, the spray gun, and the article to be sprayed; and the exhaust system off the rear of the spray booth for withdrawing excess spray vapors.

FIG. 1 illustrates a spray booth 10 in cross section, having a top wall 12 and spaced vertical end walls 14 that extend between the floor and the top wall 12 to define a front opened enclosure within which spraying activity can take place. The size of the spray booth depends on the size of the article 15 to be sprayed, but the booth generally will be at least several feet in depth, several feet up to preferably seven or eight feet in height, and five to twenty feet or more in length. At the rear of the spray booth, an exhaust plenum 16 is provided which is connected by a duct 18 through the top wall of the spray booth and through the roof (not shown) of the building within which the spray booth is housed. A fan or blower 20 is supported by arms 21 in the exhaust duct, and is powered by an electric motor 22 through a drive belt 23. A damper 26 is mounted on a shaft 28 to extend crosswise of a damper section 29. A spring 30 connected between the damper and bracket 31 normally biases the damper to its closed position crosswise to the axis of the duct (shown in solid lines in FIG. 2). A motor 32 keyed to the shaft is used for overcoming the force of spring 30 and for turning the damper clockwise in FIG. 2 to its opened position where the plane of the damper 26 is generally in line with the axis of the duct (shown in phantom in FIG. 2).

The damper 26 and its schematically illustrated shaft supported, motor opened-spring closed construction can be of conventional design, except it is preferred however that the motor be of a low output, low amperage draw configuration as will be apparent later.

Shown between the rear confines of the spray booth 10 and the exhaust plenum 16 is a cleaning system 34 illustrated in the form of removable filter pads or the like. These filters thereby remove excess paint particles from the air before it is exhausted to the atmosphere. Other type cleaning systems can be incorporated between the spray booth and exhaust system, such cleaning systems being for example of a water wash or spray type where a pump (not shown) forces water crosswise to the flow of the air through the cleaning system.

The article 15 to be sprayed is suspended by a hanger 36 from a conveyor 38 schematically shown enclosed within a housing 39. The conveyor 38 moves the articles 15 along a path crosswise of the width of the spray booth and in line generally with the cleaning system 34 and through openings 41 in the endwalls 14. Also illustrated within the spray booth is the spraying apparatus itself, generally designated at 42, and including specifically a spray gun 44 having a trigger control 46 and an eyelet 47 for supporting the gun when the same is not in use. Further a hose 49 typically communicates the spray gun 44 with a connection 50 supported from a bracket 52 adjacent the top wall 12 of the spray booth. The location of the connection is of no significance but it is common to provide for a convenient spray gun mounting location and the same is merely illustrative of a system that can be used. Although the same is not shown, it will be understood that this connection 50 communicates with a paint tank or the like for holding in bulk form the paint to be sprayed and a means for pressurizing the tank and/or pressurizing air in order to force the paint from the source through the hose to the gun for spraying discharge therefrom.

Also depending from the bracket 52 is a control box 54 supporting therefrom a hook 56. The hook 56 is designed to fit through the eyelet 47 and hold the gun when the same is not in use. For purposes of this disclosure, this hook is thereby used to determine when the spray gun is in use and when the spray gun is not in use.

Also located in the spray booth on top wall 12 are overhead illuminating lights 58, although any other illuminating lights (not shown) may be used as might be appropriate.

Figure 2:
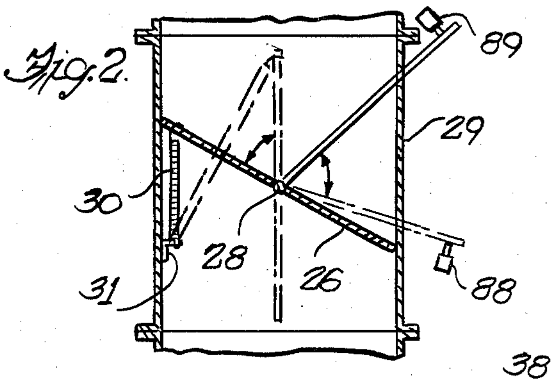
FIG. 2 is a sectional view as seen generally from line 2—2 in FIG. 1, showing additional details of the damper construction.
Figure 3:
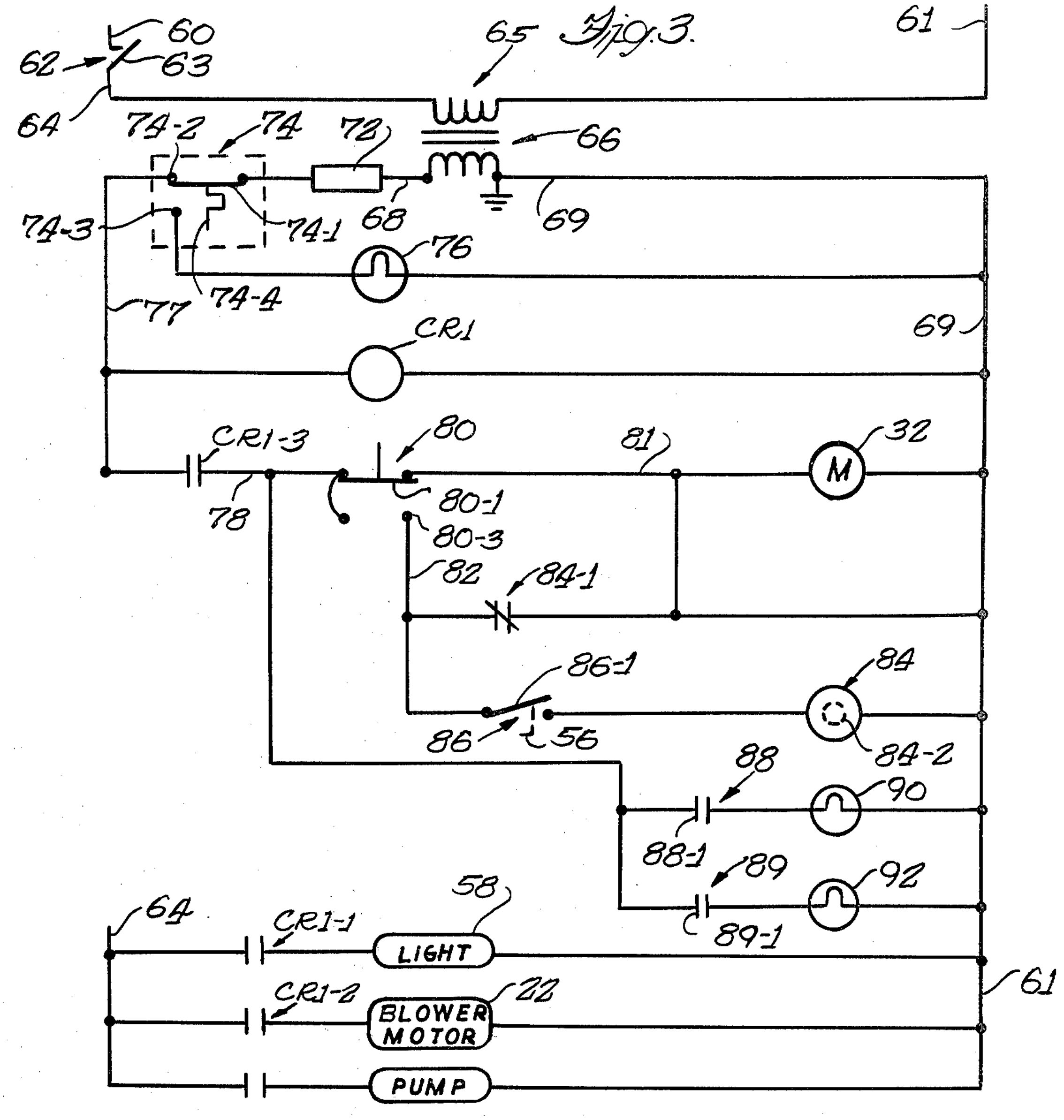
FIG. 3 is a schematic of an electric control used in the preferred embodiment of the systems illustrated in FIGS. 1 and 2.

FIG. 3 illustrates an electrical schematic for operating the paint and exhaust systems illustrated in FIGS. 1 and 2. An a.c. power connection of typical voltage is supplied across lines 60 and 61, and a main on/off switch 62 having open and closed contacts 63 is located between power lines 60 and 64. Thus, an a.c. potential exists across lines 64 and 61 whenever the main on/off switch 62 is in the on position and the contacts 63 are closed. The spray booth lights 58 are located in a series circuit across the controlled a.c. power lines 64 and 61 with the normally open contacts CR1-1; as likewise is the motor 22 for the fan or blower 20 located in a series circuit with the normally open contacts CR1-2; as likewise would be the water wash pump with additional normally opened contacts (shown only in phantom) if such a cleaning system were used. Likewise the high voltage coil 65 of a step down transformer 66 is located across the lines 64 and 61 to provide low control voltage at lines 68 and 69 from the low voltage coil 67 of the transformer. The preferred control voltage would typically be of twenty-four volts or the like for added safety and convenience, and a hot potential would therefore exist across lines 68 and 69 whenever the main on/off switch contacts were closed.

A fuse 72 is connected in series with the power line 68 as is thermal switch 74 having a movable leaf 74-1 and a normally closed contact 74-2 and a normally open contact 74-3. The thermal switch would be of conventional construction for sensing or detecting a fire, where a bimetal 74-4 for example of the switch would preferably operate when exposed to a temperature of approximately 140° F. to move the leaf 74-1 from the normally closed contact 74-2 to the normally open contact 74-3. When the same would happen, for example, responsive to the detection of a fire, a power circuit would then be completed through indicator 76, shown typically in the form of a red light, to provide a visual or sensual appraisal that the thermal switch has been shifted.

In normal operation, however, with the thermal switch 74 in the position where its leaf 74-1 is closed against the switch contact 74-2, to line 77 which thus is at a control potential relative to line 69 whenever the on/off control 62 is closed. The coil of the control relay CR1 is connected across the lines 77 and 69; and the control relay operates the previously noted normally opened contacts CR1-1, CR1-2 and a third set of normally opened contacts CR1-3. The control relay contacts CR1-3 are connected to line 78 going in turn to a seasonal selector switch 80 having a moving leaf 80-1 and a first set of contacts 80-1 which are connected by the leaf 80-1 in one operative position corresponding to a summer operation or a nonheating season, and having a second set of contacts 80-3 which would be connected by leaf 80-1 in the other operative position corresponding to a winter operation or a heating season. The summertime contacts 80-2 connect from hot potential line 78 via line 81 through the damper motor 32 to the ground potential at line 69. When the seasonal selector switch 80 is shifted to the winter position, the hot potential at line 78 is connected across the switch to line 82, which firstly connects through normally closed contacts 84-1 of the timer 84 and in turn via line 81 through the damper motor 32, and secondly connects across contacts 86-1 of the switch means 86 and in turn through the timer 84. The timer 84 allows for adjustable operation as determined by a control knob 84-2, whereby any specific delay between approximately twenty and two hundred seconds may be set to require that the set duration must lapse or pass before the timer contacts 84-1 are opened even after the timer has been energized. However, immediately upon the timer being deenergized, the contacts 84-1 would shift to their normally closed positions. Any conventional timer that operates in this manner would be suitable. Further connected off of the potential line 79 are two sets of contacts 88-1 and 89-1 respectively of limit switches 88 and 89. The limit switches are located in physical proximity to the damper to indicate when the damper is either fully opened or fully closed as illustrated schematically in FIG. 2. Thus when the damper is fully opened (as shown schematically in FIG. 2) the limit switch 88 is depressed and contacts 88-1 are closed and are connected across a visual or sensual indicator 90 for example, in the form of a green light which then would appraise the operator that the damper is opened; whereas when the damper is physically closed, the second limit switch 89 is depressed and its contacts 89-1 are closed to power indicator 92, for example in the form of an auburn light which would appraise the operator visually that such a condition did exist.

OPERATION OF THE INVENTION

The operation of the exhaust system and its damper control would preferably be as follows. The fan or blower 20 and the spray booth lights 58 would be energized and operated when the main on/off switch 62 is shifted on and the contacts 63 closed, and would remain operating until the on/off switch were opened or under certain overheat conditions as will be noted later. When the operator decides to spray and removes the spray gun 44 from the hook 56, the hook closed switch contact 86-1 are allowed to open which deenergizes the timer 84. This immediately allows the normally closed contacts 84-1 to close to energize the damper motor 32 which thereby powers the damper to the opened position. As noted earlier, the damper motor is preferably in the form of a low output fractional horsepower motor having a low amperage draw and is designed to be operated continually in the stall condition in order to maintain the damper in the opened position. The enclosure air is thereby drawn in from the open front of the spray booth and within and through the confines of the spray booth to pick up excess paint particles and move them through the cleaning system 34 to the exhaust plenum 16 and out the duct 18, as caused by the operating exhaust fan 20.

Should then the operator stop spraying activity and hang the gun on the hook 56, the hook controlled switch contacts 86-1 would be closed to activate the timer 84. As explained earlier, the timer would operate for an adjustable duration, typically in excess of twenty seconds and up to for example two hundred seconds, before opening the normally closed timer contacts 84-1 in the series connection with the damper motor 32. This continued operation of the fan with the damper in the opened position purges contaminated air within the confines of the spray booth for the adjustably set duration even after spraying activity has been terminated, as sensed by the use-nonuse hook 56. However, after the set duration has lapsed and the controlled timer contacts 84-1 open, the damper motor 32 would be deenergized and the spring 30 would be allowed to shift the damper 26 to the closed position blocking the exhaust duct 18. The fan or blower 20 would yet continue to operate, although little air would be passed through the exhaust blower or fan and out the exhaust duct because of the closed damper.

This mode of control is quite economical since the power drain of the fan motor 22 in the no load condition is appreciably less than in the normal loaded or exhausting condition. Further, the power required to shift the damper 26 between the opened and closed positions is virtually nil, since the motor 32 used to open the damper is of a low current draw type. Moreover, once the damper 26 has been closed, the air discharged from the confines of the spray hood would be reduced to virtually nothing and consequently the heat lost because of discharged air is substantially eliminated. Further, the economy of this mode of control in blocking the fan output while allowing the fan to operate compares favorably to normal heavy current start up draw of a typical fan motor or to the extreme wear of the motor 22 and/or the drive belt 23 caused by frequent start up cycling of the fan motor itself. In fact, the operation is advantageous to merely cycling the fan motor on and off, since even with the fan not operating but with the damper yet maintained open, there is still a chimney or convective air flow of the warmer enclosure or spray booth air, particularly during the heating season, up the exhaust duct that generates continued heat losses.

The damper 26 also operates as the fire damper should a fire occur in the confines of the spray booth 10. In this regard, the overheat switch 74 can be located in proximity of the spray booth such as in underlying relation to the wall 12. When the overheat switch is activated such as by the presence of heat in excess of 140° F. for example, the switch contacts 74-2 would open and drop out power to main power line 77 to the low voltage control to deenergize the control relay CR1 and the damper motor 32. This would terminate the operation of the exhaust fan 20 and the lights 58, and further would allow the damper 26 to be spring closed. Further, the shifted leaf 74-1 of the switch 74 against contact 74-3 completes a circuit with the warning indicator 76 to give sensual appraisal of the triggered fire control.

It should be noted that although the switch 86 for operating the damper timer 84 is illustrated as being located in the control box 54, the same switch might for example be located itself in the spray gun and be actuated by the trigger 46. Thus, for example, when the trigger 44 were activated to initiate a spraying action, the switch contacts 86-1 would be opened to open the exhaust damper 26; whereas when the trigger 44 were released to terminate the spraying action, the switch contacts 86-1 would be closed to start the timer 84 and the timed duration before which the damper motor 32 would be deenergized to allow the damper 26 to be closed.

While a timer 84 has been illustrated in the circuit, it is entirely possible although not the preferred embodiment to have a direct immediate response of the damper 26 closing upon the termination of the spraying activity (with the trigger control noted above) and/or upon the spray gun being hung up on hook 56. This would eliminate the continued purging of the confines of the spray booth, but under certain conditions may not even be needed.

What is claimed is:

1. An energy saving control system for use with a power operated device in a booth having an exhaust system with a blower means for withdrawing from the booth ambient air for flow through a damper to an exhausted location, said energy saving control system comprising:

motor means to the drive blower means to exhaust the ambient air through said damper and from said booth and causing an inflow of ambient air into said booth, first control circuit means controlled with operation of said power operated means and having switch means operable with use and non-use of said power operated device in the booth;

damper motor means for shifting said damper between an open position to allow exhausting of the ambient air from said booth and a closed position substantially blocking the flow of ambient air from said booth and through said exhaust system;

second circuit means controlled by operation of said switch means for operating said damper motor means to shift said damper to the closed position to block the flow of the ambient air from said booth when said switch means is in a position indicating said power operated device is off, and third circuit means continuing to operate said motor means for said blower means so that said blower means continues to operate but is ineffective to exhaust the ambient air while the power operated device is not in use and said damper is in the closed position.

2. A system in accordance with claim 1 in which said first circuit means includes a time delay means causing operation of said damper motor means for a predetermined time interval after said switch means has indicated said power operated device is in the off position to purge said booth before allowing said damper to shift to said closed position.

3. A system in accordance with claim 1 in which the booth is a paint spray booth and the power operated device is a paint spray gun, and in which said switch means includes a hook for said paint spray gun to hold the latter when it is not in use, said switch means being activated by said hook with removal or replacement of said spray gun on said hook.

4. A system in accordance with claim 1 in which said damper motor means comprises a stall motor which is, when energized, continuously operating to a stalled condition to hold said damper in its open position and includes means for biasing said damper to the closed position when said stalled motor is de-energized.

5. A system in accordance with claim 1 and including fire detecting means and further circuit means operable by said fire detecting means to de-energize said damper motor means to allow said damper to move to the closed position.

6. A system in accordance with claim 1 including another switch means associated with said damper and operable when said damper is in its fully opened or fully closed limit positions and an indicating means operable to provide an indication of which limit position the damper is in.

7. A system in accordance with claim 1 including a bypass switch means for bypassing said switch means operable with use and non-use of said power operated device and for allowing said damper motor to open and close said damper with the turning on and off of said blower means.

* * * * *